United States Patent

Mossoba et al.

(10) Patent No.: US 12,271,888 B2
(45) Date of Patent: Apr. 8, 2025

(54) GENERATION OF A COMBINATORIAL PAYMENT QR CODE

(71) Applicant: CAPITAL ONE SERVICES, LLC, McLean, VA (US)

(72) Inventors: Michael Mossoba, Arlington, VA (US); Abdelkader M'Hamed Benkreira, Washington, DC (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/654,137

(22) Filed: May 3, 2024

(65) Prior Publication Data

US 2024/0281791 A1 Aug. 22, 2024

Related U.S. Application Data

(63) Continuation of application No. 17/887,909, filed on Aug. 15, 2022, now Pat. No. 11,995,636, which is a continuation of application No. 17/104,189, filed on Nov. 25, 2020, now Pat. No. 11,449,856, which is a continuation of application No. 16/284,644, filed on Feb. 25, 2019, now Pat. No. 10,909,523.

(51) Int. Cl.
*G06Q 20/32* (2012.01)
*G06K 19/06* (2006.01)
*G06Q 20/22* (2012.01)
*G06Q 20/40* (2012.01)

(52) U.S. Cl.
CPC ... *G06Q 20/3274* (2013.01); *G06K 19/06037* (2013.01); *G06Q 20/227* (2013.01); *G06Q 20/3224* (2013.01); *G06Q 20/4014* (2013.01)

(58) Field of Classification Search
CPC .......... G06Q 20/3274; G06Q 20/3267; G06Q 20/12; G06Q 20/227; G06Q 20/3224; G06Q 20/385; G06Q 20/4014; G06Q 20/405; G06K 19/06037
See application file for complete search history.

(56) References Cited

U.S. PATENT DOCUMENTS

| 7,908,645 | B2 | 3/2011 | Varghese et al. |
| 10,223,691 | B2 | 3/2019 | Katzin et al. |
| 2007/0208686 | A1 | 9/2007 | Gupta et al. |
| 2009/0222276 | A1 | 9/2009 | Romney et al. |

(Continued)

*Primary Examiner* — Scott S Trotter
(74) *Attorney, Agent, or Firm* — DLA Piper LLP US

(57) ABSTRACT

Provided, in an aspect, is a method for performing an online transaction using a graphical construct. The method can include receiving, by a client device, inputs to generate the graphical construct; transmitting to a server in communication with the client device, a request to generate the graphical construct; receiving, by the client device, the generated graphical construct and a summary information from the server; displaying, through a user interface of the client device, a summary screen including the generated graphical construct and the summary information; embedding, by the client device, the generated graphical construct on a third-party application running on the client device; sending, by the client device, a transaction request to perform the online transaction using the generated graphical construct; and presenting for display, through the user interface of the client device, a notification including a status of the online transaction.

20 Claims, 8 Drawing Sheets

(56) References Cited

U.S. PATENT DOCUMENTS

| | | |
|---|---|---|
| 2010/0100458 A1 | 4/2010 | Kwon |
| 2011/0191249 A1 | 9/2011 | Bishop et al. |
| 2011/0228991 A1 | 9/2011 | Hicks et al. |
| 2012/0047200 A1 | 2/2012 | Szabo et al. |
| 2012/0124496 A1 | 5/2012 | Rose et al. |
| 2012/0209735 A1 | 8/2012 | Subramanian et al. |
| 2012/0284185 A1 | 11/2012 | Mettler et al. |
| 2012/0330769 A1 | 12/2012 | Arceo |
| 2013/0024364 A1 | 1/2013 | Shrivastava et al. |
| 2013/0024371 A1 | 1/2013 | Hariramani et al. |
| 2013/0073853 A1 | 3/2013 | Ford |
| 2013/0159195 A1 | 6/2013 | Kirillin et al. |
| 2013/0185210 A1 | 7/2013 | Dodson et al. |
| 2013/0226736 A1 | 8/2013 | Hogg et al. |
| 2013/0227594 A1 | 8/2013 | Boone et al. |
| 2013/0297425 A1 | 11/2013 | Wallaja |
| 2014/0019352 A1 | 1/2014 | Shrivastava |
| 2014/0172531 A1 | 6/2014 | Liberty |
| 2014/0229379 A1 | 8/2014 | Jang |
| 2014/0337957 A1 | 11/2014 | Feekes |
| 2015/0095206 A1 | 4/2015 | Van Heerden et al. |
| 2015/0112864 A1 | 4/2015 | Wallaja et al. |
| 2015/0178721 A1 | 6/2015 | Pandiarajan et al. |
| 2015/0213542 A1 | 7/2015 | Wallace |
| 2017/0004487 A1 | 1/2017 | Hagen et al. |
| 2017/0046671 A1 | 2/2017 | Shauh et al. |
| 2017/0140174 A1 | 5/2017 | Lacey et al. |
| 2017/0213212 A1 | 7/2017 | Dicker et al. |
| 2017/0221055 A1 | 8/2017 | Carlsson et al. |
| 2017/0302641 A1 | 10/2017 | Ramatchandirane et al. |
| 2018/0005229 A1 | 1/2018 | Grassadonia |
| 2018/0005323 A1 | 1/2018 | Grassadonia |
| 2018/0068290 A1 | 3/2018 | Xia |
| 2018/0082296 A1 | 3/2018 | Brashers |
| 2018/0210725 A1 | 7/2018 | Vaindiner et al. |
| 2018/0240182 A1 | 8/2018 | Schonfeld |
| 2018/0260766 A1 | 9/2018 | Podgurny et al. |
| 2018/0276674 A1 | 9/2018 | Ramatchandirane et al. |

GENERATION OF A COMBINATORIAL PAYMENT QR CODE

CROSS-REFERENCE TO RELATED APPLICATION INFORMATION

This is a continuation of U.S. patent application Ser. No. 17/887,909, filed Aug. 15, 2022, which is a continuation of U.S. patent application Ser. No. 17/104,189, filed Nov. 25, 2020, now U.S. Pat. No. 11,449,856, issued Sep. 20, 2022, which is a continuation of U.S. patent application Ser. No. 16/284,644, filed Feb. 25, 2019, now U.S. Pat. No. 10,909,523, issued Feb. 2, 2021. The entireties of which are incorporated herein by reference.

BACKGROUND

Today, anyone familiar with an online checkout process may know that there is a lot of configuration involved. Whether someone is an existing or prospective customer, there are a few different things the customer has to input. For example, a customer has to choose which card to use, payment information associated with the card, which delivery address to use, shipping speed, etc. This can be a high friction experience for the customer. Most of the conventional methods used in e-commerce checkout process do not allow the consumer to make these choices in a way that has less friction in order to get through the checkout process faster, while still allowing them to maintain control of the process.

SUMMARY

In an aspect of the present disclosure, a method for performing an online transaction with a graphical construct, includes receiving, by a client device, inputs to generate the graphical construct; transmitting to a server in communication with the client device, a request to generate the graphical construct; receiving, by the client device, the generated graphical construct and a summary information from the server; displaying, through a user interface of the client device, a summary screen including the generated graphical construct and the summary information; embedding, by the client device, the generated graphical construct on a third-party application running on the client device; sending, by the client device, a transaction request to perform the online transaction using the generated graphical construct; and presenting for display, through the user interface of the client device, a notification including a status of the online transaction.

In some embodiments, the plurality of inputs can include at least one of: a type of bank card, a mailing address of a user associated with the client device, a merchant information, a duration of expiration of the graphical construct, a threshold number of times of usage of the bank card, a threshold credit limit associated with the bank card, and a type of membership identifier associated with the bank card. In some embodiments, the summary information includes at least one of: a date associated with generation of the graphical construct, and a number of times of performing the online transaction using the graphical construct. In some embodiments, a user of the client device performs a plurality of online transactions using a single graphical construct. In some embodiments, a user of the client device performs the online transactions using a single graphical construct. In some embodiments, the user of the client device updates a number of times of using the graphical construct to perform the online transaction. In some embodiments, the method further includes, transmitting to the server in communication with the client device, an identification information derived from the graphical construct. In some embodiments, a merchant having an account on a financial institution system communicates with the server to look up the identification information prior to performing the online transaction. In some embodiments, the method includes, performing, by the client device, a comparison of a geographical location of the client device with a physical location of a merchant associated with the online transaction; and including a result of the comparison in the transaction request sent to the server. In some embodiments, the graphical construct is a single payment Quick-Response (QR) code used in a plurality of transactions performed using the client device. In some embodiments, embedding the generated graphical construct on the third-party application running on the client device further includes: performing an interaction on the user interface of a client application executing on the client device; and performing an interaction on a second user interface of the third-party application executing on the client device.

Another aspect of the disclosure relates to a method for performing an online transaction using a graphical construct. The method can include, receiving, by a server, a request from a client device to generate a graphical construct; generating, by the server, the graphical construct responsive to the received request; transmitting, by the server, the graphical construct and a summary information to the client device; receiving, by the server, a transaction request to perform the online transaction; performing, by the server, a validation of the online transaction in the received transaction request; and communicating, by the server, a validation result associated with the transaction request.

In some embodiments, the server can generate the graphical construct based on inputs including at least one of: a type of bank card, a mailing address of a user associated with the client device, a merchant information, a duration of expiration of the graphical construct, a threshold number of times of usage of the bank card, a threshold credit limit associated with the bank card, and a type of membership identifier associated with the bank card. In some embodiments, the summary information includes at least one of: a date associated with generation of the graphical construct, and a number of times of performing the online transaction using the graphical construct. In some embodiments, a user of the client device performs a plurality of online transactions using a single graphical construct generated by the server. In some embodiments, the user of the client device updates a number of times of using the graphical construct generated by the server to perform the online transaction. In some embodiments, the method further includes, receiving, by the server, an identification information derived from the graphical construct, wherein a merchant having an account on a financial institution system communicates with the server to look up the identification information prior to performing the online transaction. In some embodiments, the method further includes, receiving, by the server, in the transaction request from the client device, a comparison of a geographical location of the client device with a physical location of a merchant associated with the online transaction. In some embodiments, the graphical construct generated by the server is a single payment Quick-Response (QR) code used in a plurality of transactions performed on the client device.

Another aspect of the disclosure relates to a system for performing an online transaction with a graphical construct includes a database, an application server and one or more processors. The one or more processors are configured to receive a request from a client device to generate a graphical construct; generate the graphical construct responsive to the received request; transmit the graphical construct and a summary information to the client device; receive a transaction request to perform the online transaction on a third-party application running on the client device; perform a validation of the online transaction in the received transaction request; and communicate a validation result associated with the transaction request.

In some embodiments, the one or more processors generate the graphical construct based on inputs including at least one of: a type of bank card, a mailing address of a user associated with the client device, a merchant information, a duration of expiration of the graphical construct, a threshold number of times of usage of the bank card, a threshold credit limit associated with the bank card, and a type of membership identifier associated with the bank card.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Figure 1:
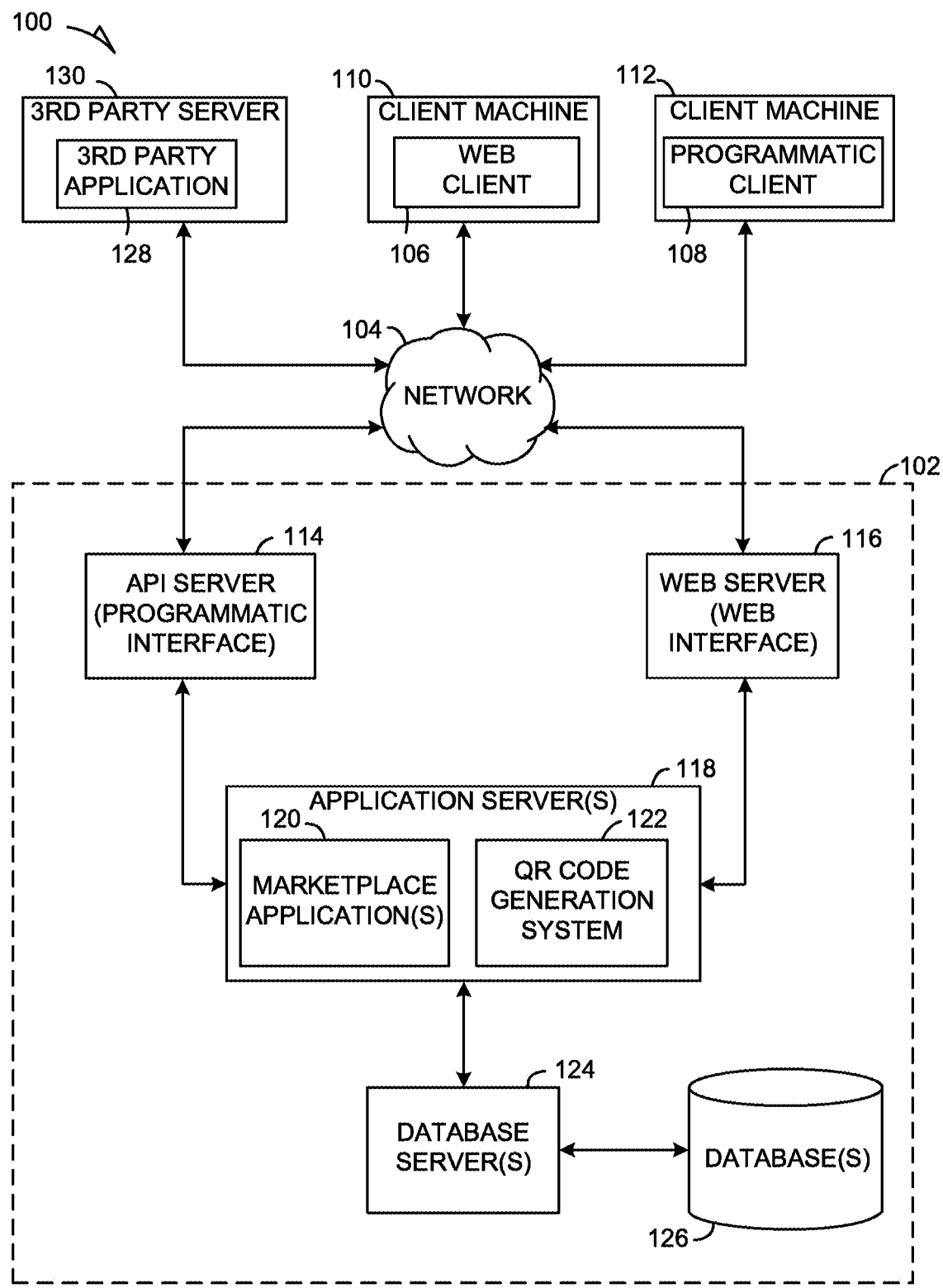
FIG. 1 is a block diagram illustrating an example network environment including a QR code generation system, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

A quick response (QR) code is a matrix bar code that can store data in two dimensions. Each QR code includes position, alignment, and timing information that is used by a QR code reader to read information stored by the QR code. QR codes are used to store information in such a way that the information can be read using a machine called a QR code reader. QR codes can be quickly generated using a software program installed on a machine. A smart phone or other mobile communication device equipped with a camera can be easily configured to read QR codes.

QR codes are becoming ubiquitous in printed media, including media published for performing online transactions. QR codes may be printed on newspapers, magazines, flyers, business cards, signs, containers, and other surfaces. QR codes may be projected onto a screen or other surface (e.g., a building). QR codes may be displayed on a computer screen, touch screen, or the like. QR codes comprise an active portion readable by a machine that is typically black and a background portion that provides contrast to the active portions and is typically white.

In one aspect, the present disclosure can relate to two steps—(1) generating a customized payment QR code and (2) pasting the QR code to pay. In regard to the first step, in generating a QR code, the customer can choose a card, choose a delivery address, and choose a limit on the card. The present disclosure can display a screen that shows that the information the user entered is now summarized in a QR code. The displayed screen can indicate when the QR code was generated, the number of times it was used, which card it is associated with, which delivery address it is associated with, the limit (when there's a limit), and when the QR code expires. A user can simply click a "click to copy" button to copy that QR code, and now, if they are currently logged in to a third-party application (i.e. Facebook Messenger or an SMS conversation) and communicating with a merchant, once they have made a selection of the product they want, they can simply paste the QR code, and the checkout process can be done in a single click. For example, the number of times of using the graphical construct could be at least one of: a number of times a user clicked the "click to copy" button, and a number of times an API of the server decrypted the graphical construct for a merchant.

Provided, in an aspect, is a method for performing an online transaction using a graphical construct. The method can include receiving, by a client device, inputs to generate the graphical construct; transmitting to a server in communication with the client device, a request to generate the graphical construct; receiving, by the client device, the generated graphical construct and a summary information from the server; displaying, through a user interface of the client device, a summary screen including the generated graphical construct and the summary information; embedding, by the client device, the generated graphical construct on a third-party application running on the client device; sending, by the client device, a transaction request to perform the online transaction using the generated graphical construct; and presenting for display, through the user interface of the client device, a notification including a status of the online transaction.

As an example, when a user goes to a merchant (e.g. video game store) and is ready to buy a video game for a video game console, the present disclosure can provide a button that the user can press to upload a payment QR code. If the user presses that button, the user can take a snapshot of the payment QR code using a screen capture software application, and can then upload the QR code to a server. One possible purchase flow can happen while text messaging with a merchant. The user could be having a text conversation with the merchant, and could send the payment QR code to pay for a product. Another possible purchase flow could involve the user purchasing a product from a sales terminal. For instance, when a person is at a convention, and a vendor has run out of whatever the person wants to buy, the vendor could read the combinatorial QR code disclosed herein with a QR code reader, and the product would be shipped to the person's mailing address.

Applications

In one aspect, a person may save time involved in an online transaction by reducing an amount of information typed by the customer on a mobile device application associated with the financial service provider. In another aspect, the present disclosure can provide a low friction checkout process that doesn't require the customer to type in every detail of their payment information and shipping preferences. In yet another aspect, the present disclosure can reduce a financial risk for the financial service provider by limiting how a payment QR code can be used by the customer. In another aspect, the combinatorial payment QR code disclosed herein can prevent a direct exposure of credit card numbers, and thus, such information are harder to capture by a third-party system. For example, the combinatorial payment QR code disclosed herein can automatically generate a virtual credit card and associate the card number with the payment QR code. By doing this way, if the payment QR code is compromised, the actual credit card information (e.g. credit card number) is still secure. In still another aspect, the present disclosure can prevent misuse of a QR code. For example, the QR code could encode a reference indicator used by a server system to identify credit card information of a consumer for use in performing a transaction. If the consumer were to, for example, send the QR code to the wrong merchant, the user may have an option on the client device to send a notification to the server system to cancel the QR code. The server system, in response to receiving such a notification, could deactivate the reference indicator or otherwise associate the reference indicator with an error code or null link, so that if the wrong merchant attempts to use the QR code to process a transaction, the transaction will not go through.

System Architecture

FIG. 1 is a network diagram depicting a client-server system 100, within which one example embodiment may be deployed. A networked system 102, in the example form of a network-based marketplace or publication system, can provide server-side functionality, via a network 104 (e.g., the Internet or Wide Area Network (WAN)) to one or more clients. FIG. 1 illustrates, for example, a web client 106 (e.g., a browser, such as Internet Explorer), and a programmatic client 108 executing on respective client machines 110 and 112.

An Application Program Interface (API) server 114 and a web server 116 can be coupled to, and provide programmatic and web interfaces respectively to, one or more application servers 118. The application servers 118 can host one or more marketplace applications 120 and a QR code generation system 122. The application servers 118 are, in turn, shown to be coupled to one or more database servers 124 that facilitate access to one or more databases 126.

The marketplace applications 120 may provide a number of marketplace functions and services to users that access the networked system 102. The marketplace applications 120 may publish or distribute QR codes as online content. The QR code generation system 122 may accordingly provide a QR generation and modification service to the marketplace applications 120 or to users. While the marketplace applications 120 and the QR code generation system 122 are shown in FIG. 1 to both form part of the networked system 102, it will be appreciated that, in alternative embodiments, the QR code generation system 122 may form part of a QR code provisioning system that is separate and distinct from the networked system 102.

As described below with reference to FIG. 4A, the QR code generation system 122 can generate a graphical construct based on a request received from a client device. In some configurations, the QR code generation system 122 can generate the graphical construct based on inputs from the client device that includes at least one of: a type of bank card (e.g. Capital One credit card), a mailing address of a user associated with the client device, a merchant information, a duration of expiration of the graphical construct, a threshold number of times of usage of the bank card, a threshold credit limit associated with the bank card, and a type of membership identifier (e.g. loyalty rewards) associated with the bank card. The QR code generation system 122 can transmit the generated graphical construct along with a summary information to the client device. In some embodiments, the graphical construct generated by the QR code generation system 122 is a single payment Quick-Response (QR) code used in a plurality of transactions performed on the client device. In some embodiments, the summary information includes at least one of: a date associated with generation of the graphical construct, and a number of times of performing the online transaction using the graphical construct.

Without storing the graphical construct on the application server 118, the financial institution may be unable to update a number of times a customer used the graphical construct, because the computer system of the financial institution may not know whether the graphical construct (e.g. a payment QR code) was actually used, unless the customer was synching their device back with the application server 118. The application server 118 can increment a counter when a transaction was actually charged, not just when a customer copied and pasted the graphical construct on a third-party application associated with a merchant. The financial institution system can look for identifiable transactions that are associated with the graphical construct that was created, and increment the counter.

In some embodiments, as described below with reference to FIG. 3, the application server 118 can receive a transaction request from a client device (e.g. client machine 112) to perform an online transaction on a third-party application running on the client device. In some configurations, the application server 118 can receive the transaction request from the third party server 130 through the API server 114. The third party server 130 can receive a notification from the application server 118 about the success/failure of an online transaction associated with the transaction request. The application server 118 can perform a validation of the online transaction in the received transaction request. The application server 118 can communicate a validation result associated with the transaction request to the client device. In some embodiments, the client machine 110 can perform a comparison of a geographical location of the client machine 110 with a physical location of a merchant associated with the third party server 130. For example, the geographical location of the client machine 110 could be "Washington D.C." and the physical location of the merchant could be "Boston." A comparison in the transaction request can be communicated from the third party server 130 to the application server 118. A result of the comparison can indicate, for example, whether the client machine 110 and the physical location of the merchant are within a threshold distance in between (e.g. within the same city/state).

In some embodiments, the graphical construct generated by the QR code generation system 122 can encode some type of token or unique identifier. A merchant could then decode the QR code, and contact the application server 118 using the token or identifier, and the application server 118 could use the token or identifier to return the actual credit card information. The application server 118 could force the merchant to validate themselves before the financial institution system would provide the merchant with the actual credit card information. That validation could be done using API keys, tokens, or some type of secured token on the request to get the data. Whether the payment data was in the graphical construct itself or looked up at the application server 118 using a token, the payment data may be delivered in a structured format, for example, in XML or JSON. In some configurations, the payment data could be delivered in any type of structured format (e.g. space separated, a single line with a plurality of characters, etc.). In alternate configurations, the payment data could be any type of standardized format which the merchant would translate for their purposes. By doing this way, the financial institution system may not fill in payment fields for the merchant, but instead, simply provide the information so the merchant can fill in the fields.

Further, while the system 100 shown in FIG. 1 employs a client-server architecture, the present disclosure is of course not limited to such an architecture, and could equally well find application in a distributed or peer-to-peer architecture system, for example. The various marketplace applications 120 and the QR code generation system 122 can also be implemented as standalone software programs, which do not necessarily have networking capabilities.

The web client 106 can access the various marketplace applications 120 and the QR code generation system 122 via a web interface supported by the web server 116. Similarly, the programmatic client 108 can access the various services and functions provided by the marketplace applications 120 and the QR code generation system 122 via a programmatic interface provided by the API server 114. The programmatic client 108 may, for example, be a seller application (e.g., the Auto Navigator application developed by Capital One Financial Corporation (McLean, VA)) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
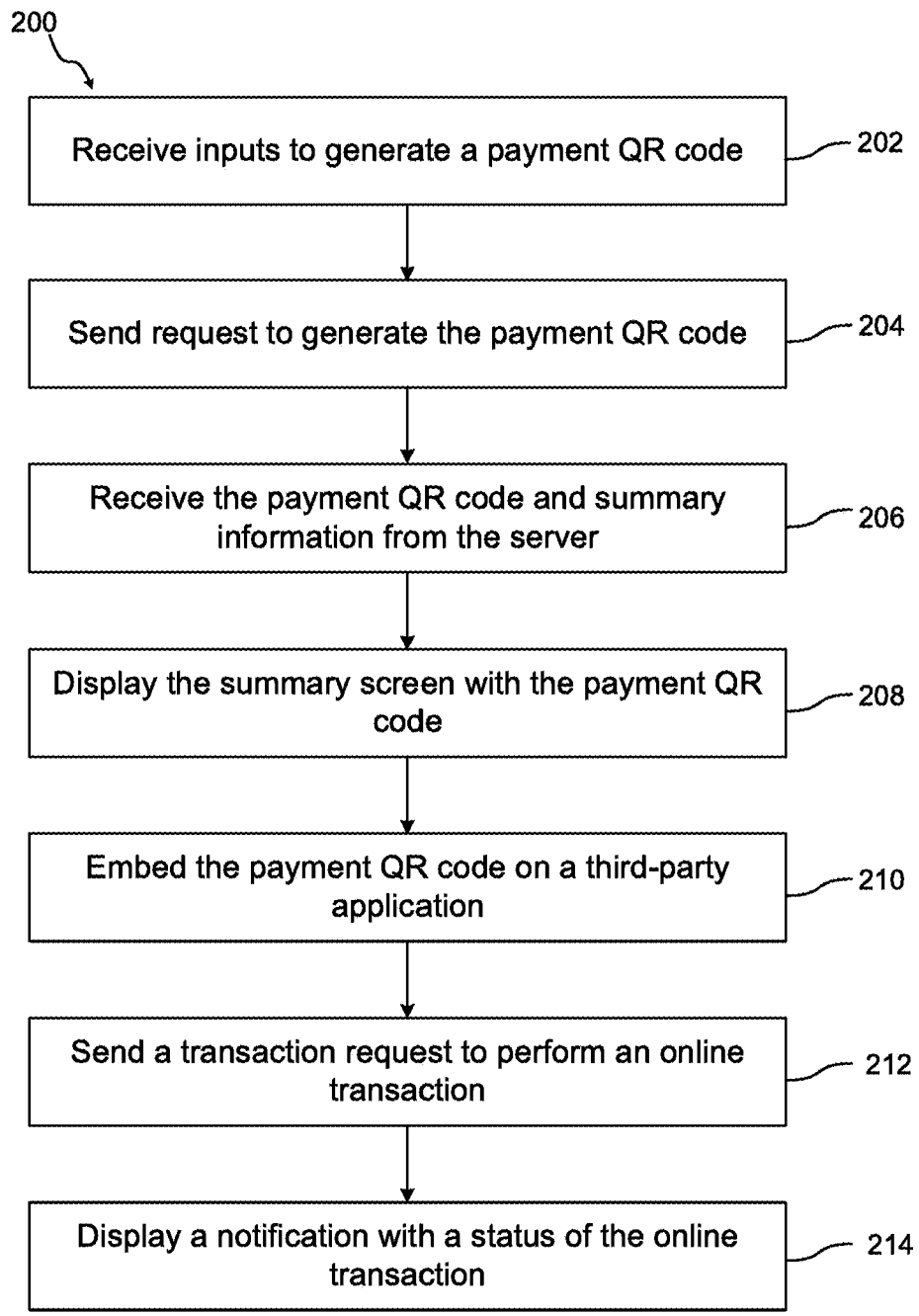
FIG. 2 is a flow diagram showing processing that may occur within the client machine of FIG. 1, according to some embodiments of the present disclosure.

FIG. 2 is a flow diagram showing processing that may occur within the system 100 of FIG. 1, according to some embodiments of the present disclosure. The flow diagram 200 of FIG. 2 may be performed by the client machine 110. Other entities may perform some or all of the steps of the process in other embodiments. Likewise, embodiments may include different and/or additional steps, or perform the steps in different orders.

The system 100 can receive 202 inputs to generate the graphical construct. For example, the received inputs from the client machine 112 can include at least one of: a type of bank card (e.g. Capital One credit card), a mailing address of a user associated with the client device, a merchant information, a duration of expiration of the graphical construct, a threshold number of times of usage of the bank card, a threshold credit limit associated with the bank card, and a type of membership identifier (e.g. loyalty rewards) associated with the bank card.

The system 100 can send 204 to a server in communication with the client device, a request to generate the graphical construct. For example, the graphical construct can be a single payment Quick-Response (QR) code used in a plurality of transactions performed on the client device.

The system 100 can receive 206 the generated graphical construct and a summary information from the server. For example, the summary information can include at least one of: a date associated with generation of the graphical construct, and a number of times of performing the online transaction using the graphical construct.

The system 100 can display 208 a summary screen including the generated graphical construct and the summary information. More details about the summary screen are described below with reference to FIG. 4B.

The system 100 can embed 210 the generated graphical construct on a third-party application running on the client device. More details about embedding the generated graphical construct on the third-party application are described below with reference to FIG. 5B.

The system 100 can send 212 a transaction request to perform the online transaction using the generated graphical construct. In some configurations, the system 100 can send the transaction request to a merchant selling a product of interest to a user of the system 100, and the merchant can communicate the transaction request to the server to perform the online transaction. For example, the client machine 112 can send a transaction request to a third party server 130, which can communicate with the API server 114 to perform the online transaction for the user using the generated graphical construct.

The system 100 can display 214 a notification including a status of the online transaction. More details about the notification including the status of the online transaction are described below with reference to FIG. 5B.

Figure 3:
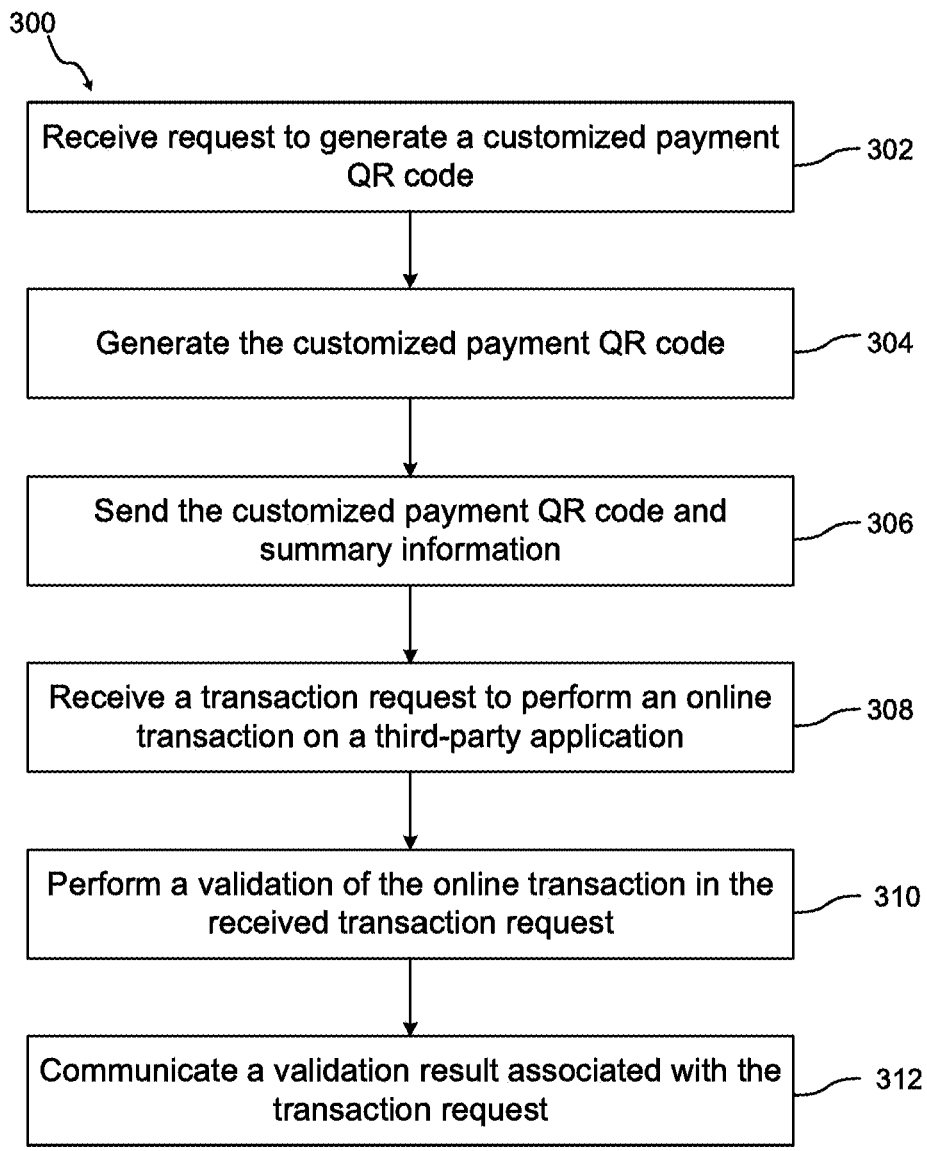
FIG. 3 is a flow diagram showing processing that may occur within the QR code generation system of FIG. 1, according to some embodiments of the present disclosure.

FIG. 3 is a flow diagram showing processing that may occur within the system 100 of FIG. 1, according to some embodiments of the present disclosure. The flow diagram 300 of FIG. 3 may be performed by the QR Code generation system 122 of FIG. 1. Other entities may perform some or all of the steps of the process in other embodiments. Likewise, embodiments may include different and/or additional steps, or perform the steps in different orders.

The system 100 can receive 302 a request from a client device to generate a graphical construct. For example, the client machine 112 can send the request to generate a payment QR code to the application server 118.

The system 100 can generate 304 the graphical construct responsive to the received request. In some configurations, the application server 118 can generate the graphical construct based on inputs from the client device that includes at least one of: a type of bank card (e.g. Capital One credit card), a mailing address of a user associated with the client device, a merchant information, a duration of expiration of the graphical construct, a threshold number of times of usage of the bank card, a threshold credit limit associated with the bank card, and a type of membership identifier (e.g. loyalty rewards) associated with the bank card.

The system 100 can send 306 the graphical construct and a summary information to the client device. In some embodiments, the summary information includes at least one of: a date associated with generation of the graphical construct, and a number of times of performing an online transaction using the graphical construct.

The system 100 can receive 308 a transaction request to perform the online transaction. In some configurations, the system 100 can receive the transaction request from a merchant selling a product of interest to a user of the client machine 112. The merchant can communicate the transaction request through the API server 114. For example, the application server 118 can receive from a third party server 130 a transaction request to perform the online transaction using the generated graphical construct.

The system 100 can perform 310 a validation of the online transaction in the received transaction request. For example, the application server 118 could force a merchant to validate themselves before the system 100 would provide the merchant with the actual credit card information. The system 100 could perform the validation using API keys, tokens, or some type of secured token in the received transaction request. The system 100 can communicate 312 a validation result associated with the transaction request. For example, the validation result could provide the third party server 130 with verification of success/failure, along with decoded information (e.g. shipping address of a customer) in the combinatorial payment QR code. In some configurations, the system 100 could process the online transaction and communicate a notification to the third party server 130 that the online transaction was successful.

Example of Generating a Combinatorial Payment QR Code

Figure 4A:
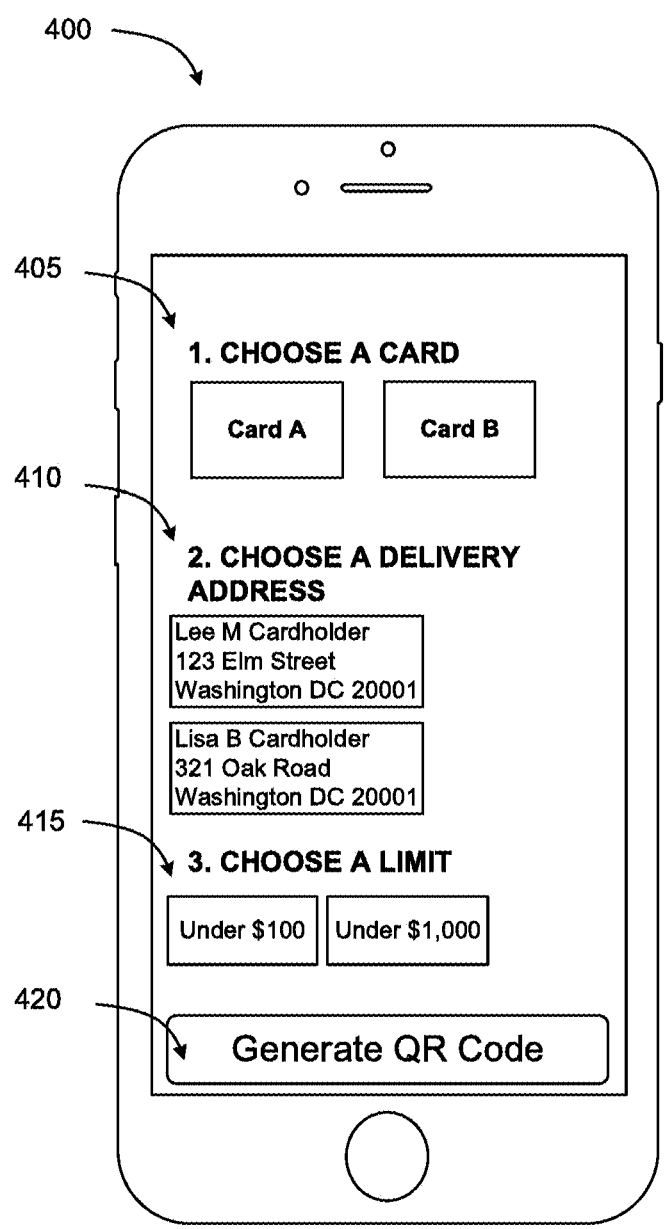
FIG. 4A is an illustrative example of a user interface for generating a combinatorial QR code using the QR code generation system of FIG. 1, according to some embodiments of the present disclosure.

FIG. 4A is an illustrative example of a screen 400 of a user interface for generating a combinatorial QR code using the QR code generation system 122 of FIG. 1, according to some embodiments of the present disclosure. Example screen 400 illustrates a user interface for generating a QR code when a customer of a financial institution system chooses a card, chooses a delivery address, and chooses a limit on the card. As shown in FIG. 4A, the customer can perform choosing a type of card (e.g. Capital One Venture, Capital One Quicksilver, etc.) 405, choosing a delivery address 410, and choosing a limit (e.g. under $100, under $1000, etc.) 415. The user interface 400 can include a generate QR code button 420 to send a request to a server to generate a graphical construct (e.g. payment QR code).

Figure 4B:
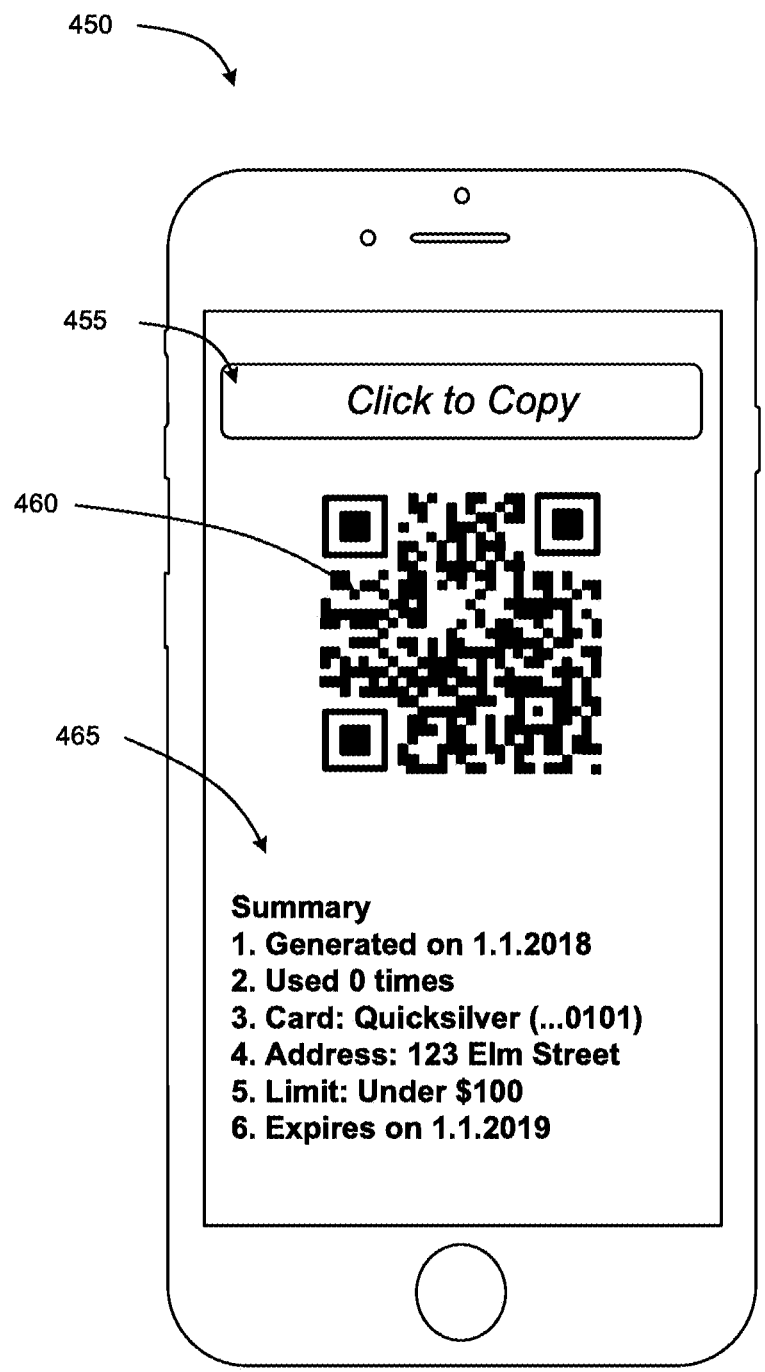
FIG. 4B is an illustrative example of a user interface for embedding a combinatorial QR code generated by the QR code generation system of FIG. 1, according to some embodiments of the present disclosure.

FIG. 4B is an illustrative example of a screen 450 of a user interface for embedding a combinatorial QR code generated by the QR code generation system 122 of FIG. 1, according to some embodiments of the present disclosure. As shown in FIG. 4B, the screen 450 can include a click to copy button 455, a graphical construct 460, and a summary information 465. When a customer of the financial institution system presses the click to copy button 455, the generated QR code 460 can be copied and embedded into multiple online checkout processes with different types of merchants. The summary information 465 in the example of FIG. 4B can display the date when the QR code was generated, the number of times the QR code has been used, a type of credit card, a physical address associated with the credit card holder, a limit on the maximum amount of transaction using the QR code, and an expiration date associated with the QR code. Note that a customer of a financial institution system can use the same QR code in multiple transactions. Also, the line item "used 0 times" can be updated when the customer returns to the user interface 450 to reflect the number of times the QR code has been used by the customer. Note that the number of times of using the combinatorial payment QR code could be at least one of: a number of times a user clicked the "click to copy" button 455, and a number of times the API server 114 decrypted the combinatorial payment QR code for a merchant associated with the third-party server 130.

Figure 5A:
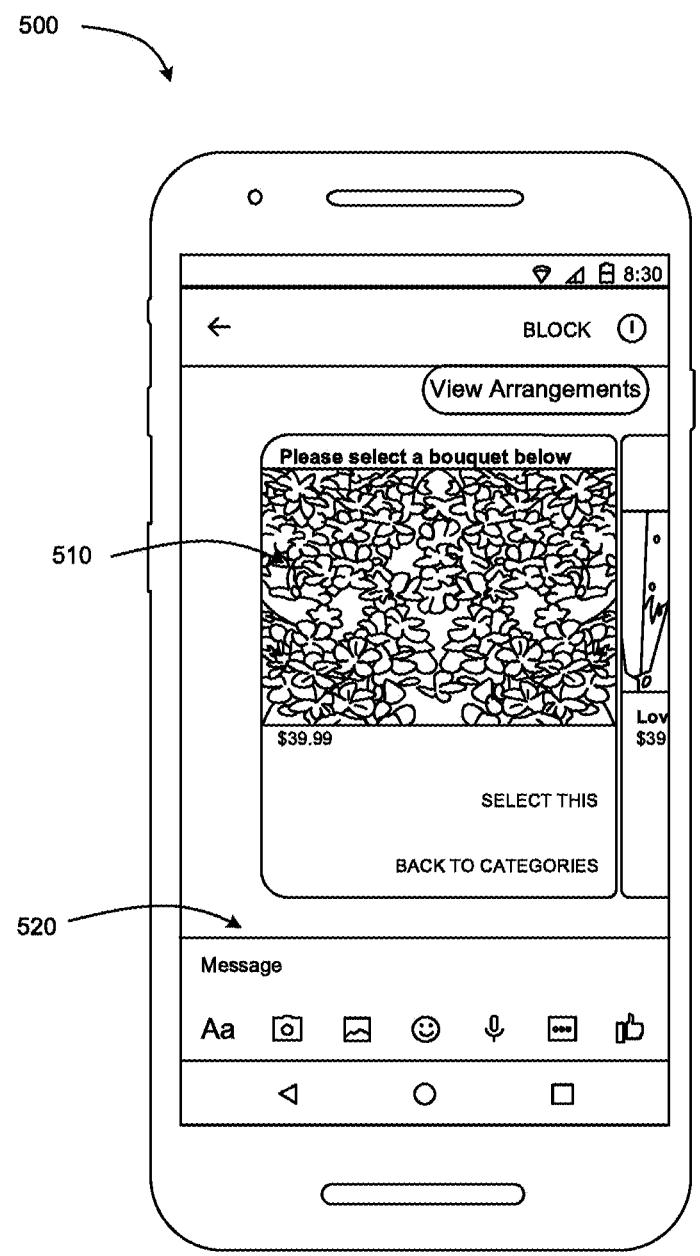
FIG. 5A is an illustrative example of a user interface showing a merchant displaying a product for sale on the client machine of FIG. 1, according to some embodiments of the present disclosure.

FIG. 5A is an illustrative example of a screen 500 of a user interface showing a merchant displaying a product for sale on the client machine 110 of FIG. 1, according to some embodiments of the present disclosure. As shown in FIG. 5A, the screen 500 includes a display provided by a third-party application that allows the customer of the financial institution system to select a product 510 available for sale. The third-party application could display a message 520 in a SMS conversation or a messenger application (e.g. WhatsApp).

Figure 5B:
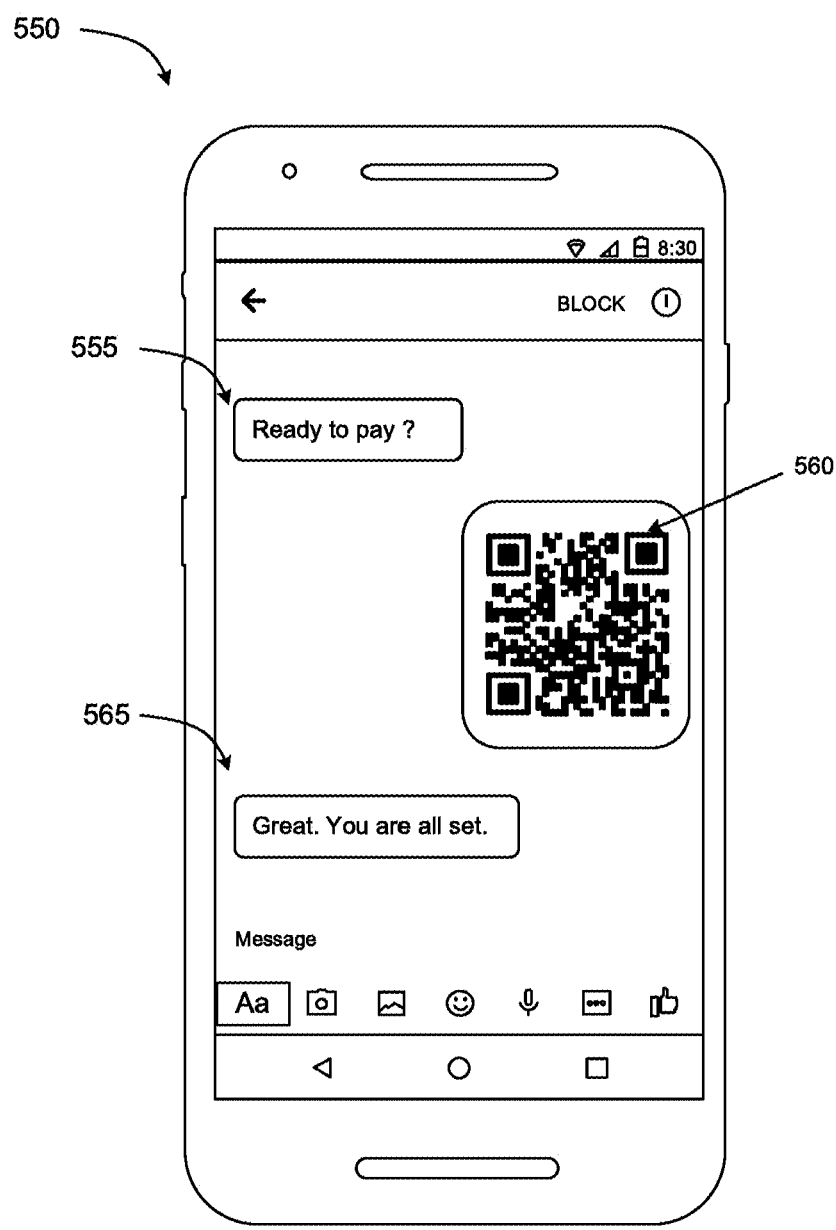
FIG. 5B is an illustrative example of a user interface of a customer performing an online transaction with the merchant using the combinatorial QR code generated by the QR code generation system of FIG. 1, according to some embodiments of the present disclosure.

FIG. 5B is an illustrative example of a screen 550 of a user interface where a customer performs an online transaction with the merchant using the combinatorial QR code generated by the QR code generation system 122 of FIG. 1, according to some embodiments of the present disclosure. As shown in FIG. 5B, the screen 550 could display a message "Ready to pay?" 555 which lets the client machine 112 communicate with the application server 118 a transaction request to perform an online transaction for the product 510 available for sale with the merchant through the third-party application. In response to validating the transaction request to perform the online transaction with the merchant, the application server 118 can generate a graphical construct 560 (e.g. payment QR code). The screen 550 could then display a notification 565 including a status of the online transaction (e.g. Great. You are all set).

Example Machine Architecture and Machine-Readable Medium

Figure 6:
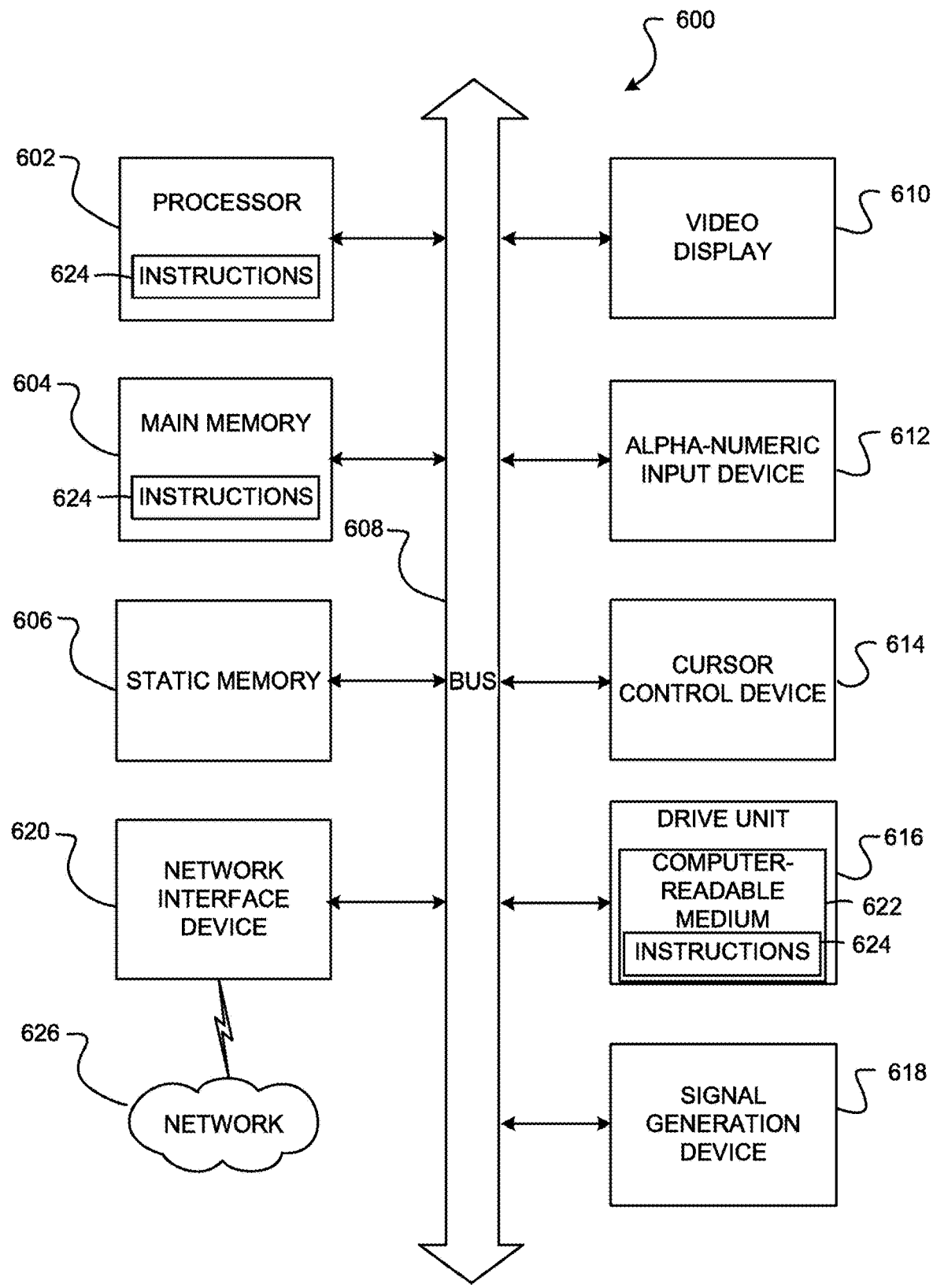
FIG. 6 is a block diagram of a machine in the example form of a computer system within which a set of instructions, for causing the machine to create a graphical construct, may be executed, according to some embodiments of the present disclosure.

FIG. 6 is a block diagram of a machine in the example form of a computer system 600 within which a set instructions, for causing the machine to create a combinatorial payment QR code, may be executed, according to some embodiments of the present disclosure. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD), a cathode ray tube (CRT), or a touch screen). The computer system 600 also includes an alphanumeric input device 612 (e.g., a keyboard or a touch screen), a user interface (UI) navigation device 614 (e.g., a mouse or a touch screen), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

CONCLUSION

The foregoing description of the embodiments of the disclosed subject matter has been presented for the purpose of illustration; it is not intended to be exhaustive or to limit the subject matter to the precise forms disclosed. Persons skilled in the relevant art can appreciate that many modifications and variations are possible in light of the above disclosure.

Some portions of this description describe the embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed subject matter may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed subject matter be limited not by this detailed description, but rather by any claims that issue on an application based hereon. Accordingly, the disclosure of the embodiments of the subject matter is intended to be illustrative, but not limiting, of the scope of the subject matter, which is set forth in the following claims.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette, and so forth but does not include a transitory signal per se. In describing exemplary embodiments, specific terminology is used for the sake of clarity. For purposes of description, each specific term is intended to at least include all technical and functional equivalents that operate in a similar manner to accomplish a similar purpose.

Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the disclosed subject matter. Further still, other embodiments, functions and advantages are also within the scope of the disclosed subject matter.

What is claimed is:

1. A non-transient computer readable medium containing program instructions for causing a computer to perform the method of:
receiving a plurality of inputs associated with an online transaction;
generating a digital graphical construct based on the plurality of inputs, wherein the digital graphical construct is configured to be copied and pasted on a client device;
generating summary information based on the plurality of inputs;
providing for display a summary screen comprising the generated digital graphical construct and the summary information; and
receiving a notification comprising a status of the online transaction.

2. The computer readable medium of claim 1, wherein the plurality of inputs comprises at least one of a type of bank card, a mailing address of a user, and merchant information.

3. The computer readable medium of claim 2, wherein the type of bank card comprises information associated with at least one of: a credit card, a debit card, a prepaid card, and a loyalty card.

4. The computer readable medium of claim 1, wherein the digital graphical construct is a Quick-Response (QR) code.

5. The computer readable medium of claim 4, wherein the QR code is configured to expire after a predetermined duration.

6. The computer readable medium of claim 5, wherein the predetermined duration is based on one of a specific date, a number of uses, or a transaction amount limit.

7. The computer readable medium of claim 1, wherein the summary information comprises a date associated with the generation of the digital graphical construct.

8. The computer readable medium of claim 1, wherein the summary information comprises a number of times the digital graphical construct has been used to perform online transactions.

9. The computer readable medium of claim 1, wherein the method further comprises updating the summary information upon each use of the digital graphical construct.

10. The computer readable medium of claim 1, wherein the notification comprises information comprising at least one of: transaction approval, transaction denial, and a request for additional authentication.

11. The computer readable medium of claim 1, wherein the method further comprises embedding the digital graphical construct within a third-party application interface on the client device.

12. The computer readable medium of claim 11, wherein the third-party application interface is associated with a messaging application.

13. The computer readable medium of claim 1, wherein the method further comprises transmitting the digital graphical construct to a server for validation prior to completing the online transaction.

14. The computer readable medium of claim 13, wherein the server is associated with a financial institution.

15. The computer readable medium of claim 1, wherein the method further comprises performing a comparison of a geographical location of the client device with a physical location of a merchant.

16. The computer readable medium of claim 15, wherein the method further comprises including a result of the comparison in the summary information.

17. The computer readable medium of claim 1, wherein the method further comprises encrypting the digital graphical construct prior to transmission to the client device.

18. The computer readable medium of claim 17, wherein the method further comprises decrypting the digital graphical construct by the client device upon receipt.

19. The computer readable medium of claim 1, wherein the method further comprises associating a threshold credit limit with the digital graphical construct.

20. A computerized method comprising:
receiving, by a processor, a plurality of inputs associated with an online transaction;

generating, by the processor, a digital graphical construct based on the plurality of inputs, wherein the digital graphical construct is configured to be copied and pasted on a client device;

generating, by the processor, summary information based on the plurality of inputs;

providing, by the processor, for display a summary screen comprising the generated digital graphical construct and the summary information; and receiving, by the processor, a notification comprising a status of the online transaction.

\* \* \* \* \*